Dec. 3, 1940.    I. M. HAMPTON    2,223,823
FISHING FLOAT ATTACHMENT
Filed Dec. 18, 1939
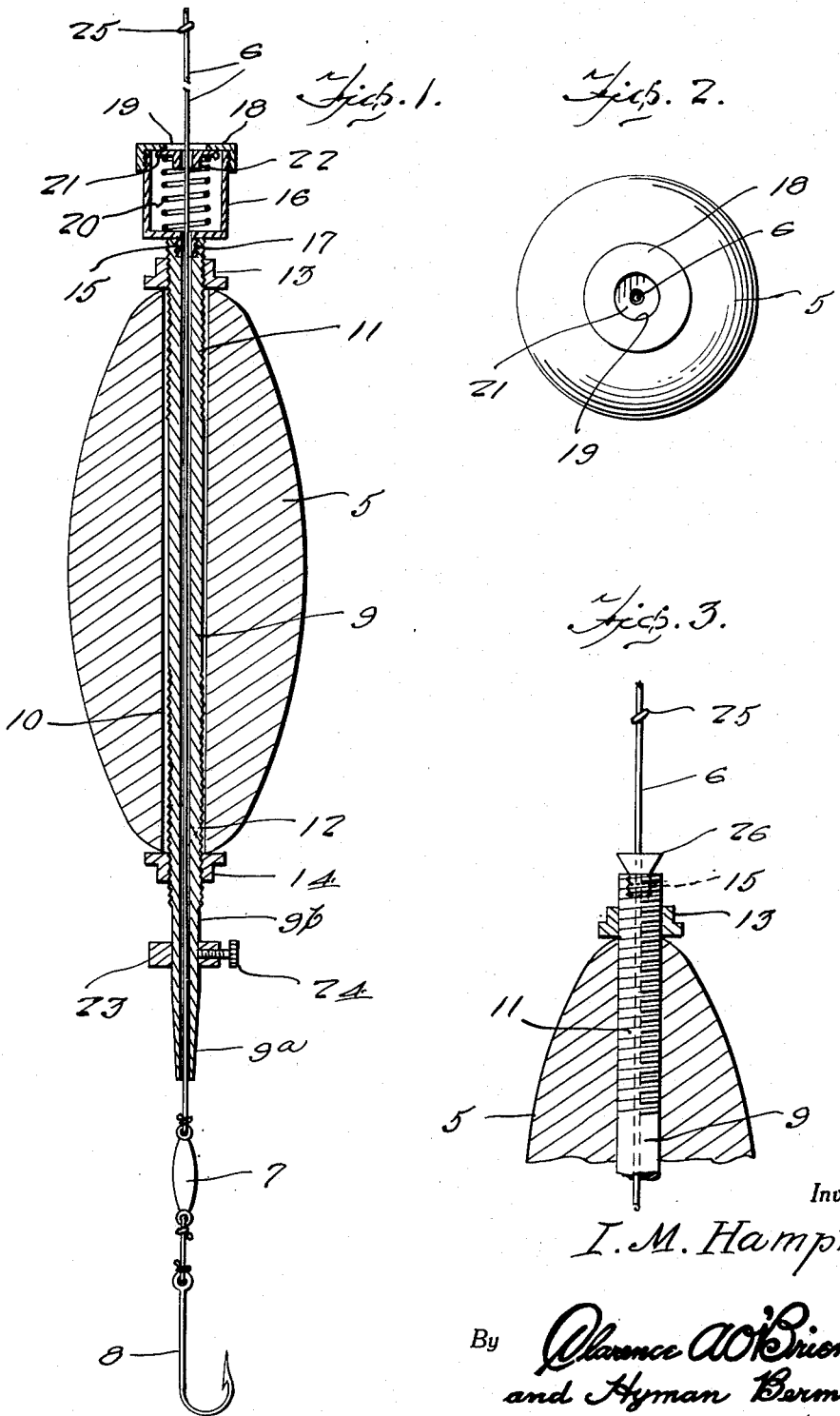
Inventor
I. M. Hampton
By Clarence A. O'Brien
and Hyman Berman
Attorneys Patented Dec. 3, 1940

2,223,823

UNITED STATES PATENT OFFICE 2,223,823

FISHING FLOAT ATTACHMENT

Isaac Monroe Hampton, Nilwood, Ill.

Application December 18, 1939, Serial No. 309,890

7 Claims. (Cl. 43—49)

This invention relates broadly to fishing floats and more particularly to an attachment for use in conjunction therewith.

More particularly the invention has reference to what may be termed "an adapter," and the primary object of the invention is the provision of an adapter by the application of which any float suitable for pole and line, or rod and reel fishing, may be cast long distances, and automatically set at any given depth.

The invention together with its objects and advantages will be best understood from a study of the following description taken in connection with the accompanying drawing, wherein—

Figure 1 is a longitudinal sectional view illustrating the application of the invention.

Figure 2 is a top plan view, and

Figure 3 is a fragmentary detail view partly in section and partly in elevation illustrating certain details hereinafter more fully referred to.

Referring more in detail to the drawing it will be seen that 5 indicates generally a conventional float of any suitable buoyant material; while the fishing line is indicated generally by the reference numeral 6 and in the present instance is shown as being equipped, at one end thereof, with a weight or sinker 7 and a hook 8, all in a more or less conventional manner.

The salient feature of the present invention is the provision of what may be termed an adapter. This adapter comprises an elongated tubular member 9 that is adapted to extend through a longitudinal bar 10 provided therefor in the float 5.

The tubular member 9 is provided with threaded sections 11 and 12 to accommodate threaded collars 13 and 14, respectively, that serve to confine the line on the tubular member 9 between said collars 13 and 14 the float 5 as clearly shown. Thus through the medium of the collars 13 and 14 the float 5 may be retained on the stem 9 at the desired adjustment longitudinally of the stem or tubular member 9.

The tubular member 9 is adapted to have trained therethrough the fishing line 6 as shown.

One end of the stem or tubular member 9 is tapered as at 9a while at the opposite end thereof the stem or tubular member 9 is provided with an internally threaded socket 15.

Further the attachment embodies a housing or casing 16 that is provided with an integral threaded stem 17 that threads into the socket 15 of the stem or tubular member 9 as shown.

For the casing 16 there is provided a threaded cap 18 that is provided with an enlarged opening 19 through which the line 6 extends.

The casing 16 forms a housing for a coil spring 20 through which the line 6 axially extends and one end of the spring 20 bears against the bottom end of the casing 16 while an opposite end of the spring bears against a floating plate 21 that is normally urged against the inner side of the crown of cap 18 as shown in Figure 1. The floating plate 21 is provided with an aperture to accommodate the line 6 and at said aperture with an integral boss or cylindrical flange 22 that is accommodated by the spring 20 in a manner clearly shown.

To compensate for the weight at the upper end of the stem or tubular member 9 caused by the housing or casing 16 and associated parts there is provided a balance weight 23 that is sleeved on a reduced portion 9b of the stem or tubular member 9 and is secured at the desired adjustment through the medium of a set screw 24. In connection with the balance weight 23 it will be seen that when the balance weight 23 is in a position nearer to the float 5 the float 5 will have a tendency to tip to an angle relative to the perpendicular while when the weight 23 is in a position on the stem 9 farther from the float 5 the tendency will be to hold the float 5 substantially perpendicular.

At a suitable position on the line 6 above the float 5 there is provided a suitable stop or abutment, such as, for example, a knot 25.

From the above it will be apparent that in actual practice when the line has been cast the line 6 will pass through the stem 9 until the stop or abutment member 25 comes into engagement with the floating plate 21 thus placing the line from the knot 25 to the weight 7 under tension. Consequently when a fish seeking the bait on the hook 8 begins to nibble at the bait a pull will be exerted on the line 6 with the result that spring 20 will go into action in a manner to impart a jerking motion to the line 6 with the result that the hook 8 will impale or gouge the fish in a positive manner.

As shown in Figure 3, certain parts of the adapter, as above described, may be omitted, as for example, the housing or casing 16, the parts associated therewith, and spring 20. When these parts are eliminated there is used in connection with the tubular member 11 of the adapter a plug 26, which in the present instance is shown as having a threaded stem to thread within the socket 15. The plug 26 has a through opening therein to accommodate the fishing line 8 as shown.

In connection with the attaching of the housing or casing 16 to the tubular member 9 of the adapter, and the attaching of the plug 26 to said tubular member, it will be understood that while such attaching has been described as being in the form of a threaded connection, any other suitable connection may be used as might be found more desirable.

From the above it will be apparent that in using the adapter either with all of the parts as illustrated and described in Figure 1, or with just such selected parts as illustrated and described with regard to Figure 3, such adapter, as so used, will cooperate with the stop 25 provided in any suitable manner on the line to permit only so much of the length of the line to pass therethrough as found desirable, to the end that by the attachment of the adapter to any desired type of float, such is made adaptable to various depths and distances.

Obviously, by use of the casing 16 and associated parts, together with the spring 20, functioning in the manner hereinbefore described, an additional advantage will accrue, namely, the "jerking" of the line to assist in "snagging" of the fish on the hook of the line.

It will also be apparent that in accordance with the present invention any desired number of adapters embodying the features of the present invention may be used on a single board, or other buoyant material, as is used in trotline fishing, or in connection with a single float; and that by the use of such an attachment or adapter various types of floats may be readily made adaptable to various depths and distances, with the added advantage, when desired, of the spring 20 and associated parts, nor ordinarily used with such equipment.

It will also be appreciated that by the use of such an attachment or adapter various types of floats are made adaptable to various depths and distances, having at the same time, all the advantages of the conventional float now in use plus the advantages of taut line fishing.

Further, the adapter may be readily removed from one particular kind of float and associated with a different kind of float or any combination of floats desired.

It is believed that a clear understanding of the construction, utility, manner of use, and advantages of an invention of this character will be had without a more detailed description thereof.

Having thus described the invention what is claimed as new is:

1. In a float for fishing lines, a float having a bore therethrough, a tubular member extending through said bore, means adjustable on the tubular member above and below the float for retaining the latter at the desired position of adjustment on said tubular member, said tubular member being adapted to have the fish line trained therethrough, a housing associated with one end of said tubular member and through which the line extends, a floating plate in said housing, and a spring within said housing bearing at one end on said plate and normally urging the same toward one end of said housing, said spring and floating plate being cooperable with an abutment on the fishing line at a predetermined point in the length of the line for coaction therewith in imparting a jerking action to the line resulting from a disturbance to the line by a fish nibbling at the bait on the hook-equipped end of the line.

2. In combination with a fishing line having a sinker at the hook-equipped end thereof and a stop element on the line at a predetermined position remote from said sinker, an apertured float for disposition on the line intermediate said sinker and stop, an elongated tubular member extending through said float, collars threaded on said tubular member and confining the float on said member between said collars, and a spring device associated with one end of said stem and cooperable with the stop member on the line as and for the purpose specified.

3. In combination with a fishing line having a sinker at the hook-equipped end thereof and a stop element on the line at a predetermined position remote from said sinker, an apertured float for disposition on the line intermediate said sinker and stop, an elongated tubular member extending through said float, collars adjustable on said tubular member to attach the float on said member between said collars, and a spring device associated with one end of said tubular member and cooperable with the stop member on the line, and a counterbalance weight means adjustably mounted on said tubular member at the end thereof remote from said spring device.

4. In combination with a fishing line having a sinker at the hook-equipped end thereof and a stop element on the line at a predetermined position remote from said sinker, an apertured float for disposition on the line intermediate said sinker and stop, an elongated tubular member extending through said float, collars threaded on said tubular member and confining the float on said member between said collars, and a spring device associated with one end of said tubular member and cooperable with the stop member on the line, and a counterbalance weight means adjustably mounted on said tubular member at the end thereof remote from said spring device, and said spring device comprising a casing, a floating plate mounted in the casing for engagement with said stop device, and a spring interposed between the floating plate and a wall of the casing and normally urging the floating plate in the direction of said stop.

5. A float for fishing lines, said float having a bore therethrough, a tubular member accommodated within the bore of said float, means adjustably associated with said tubular member for confining the float to a predetermined position thereon, and a spring tension device associated with said tubular member for engagement with a stop on the fish line and for cooperation with the usual sinker for maintaining the fish line between said stop and sinker in a relatively taut condition, said spring tension device including a spring accommodating casing, and interengaging means on said casing and said tubular member for detachably connecting said casing with the tubular member.

6. A float for fishing lines, said float having a bore therethrough, a tubular member accommodated within the bore of said float, means adjustably associated with said tubular member for confining the float to a predetermined position thereon, and a spring tension device associated with said tubular member for engagement with a stop on the fish line and for cooperation with the usual sinker for maintaining the fish line between said stop and sinker in a relatively taut condition.

7. In a float for fishing lines, a float having a bore therethrough, a tubular member extending through said bore, means adjustable on the tubular member above and below the float for retaining the latter at the desired position of adjustment on said tubular member, said tubular member being adapted to have a fishline trained therethrough, a housing associated with one end of said tubular member and through which the line extends, a floating member in said housing, and a spring within said housing bearing at one end on said floating member and normally urging the same toward one end of said housing, said spring and floating member being cooperable with an abutment on the fishing line at a predetermined point in the length of the line for co-action therewith in imparting a jerking action to the line resulting from a disturbance to the line by a fish nibbling at the bait on the hook equipped end of the line.

ISAAC MONROE HAMPTON.